W. C. HURST.
STEERING WHEEL FOR AEROPLANES.
APPLICATION FILED MAY 23, 1921. RENEWED JUNE 9, 1922.
1,424,143.
Patented July 25, 1922.
2 SHEETS—SHEET 1.
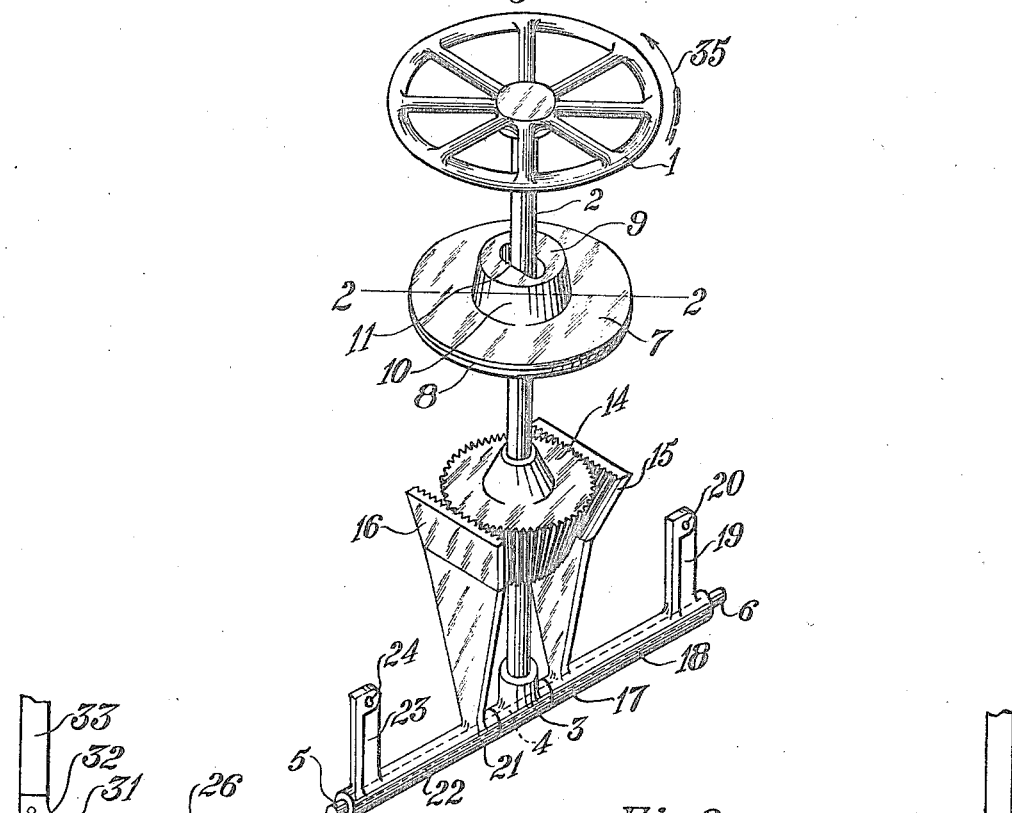
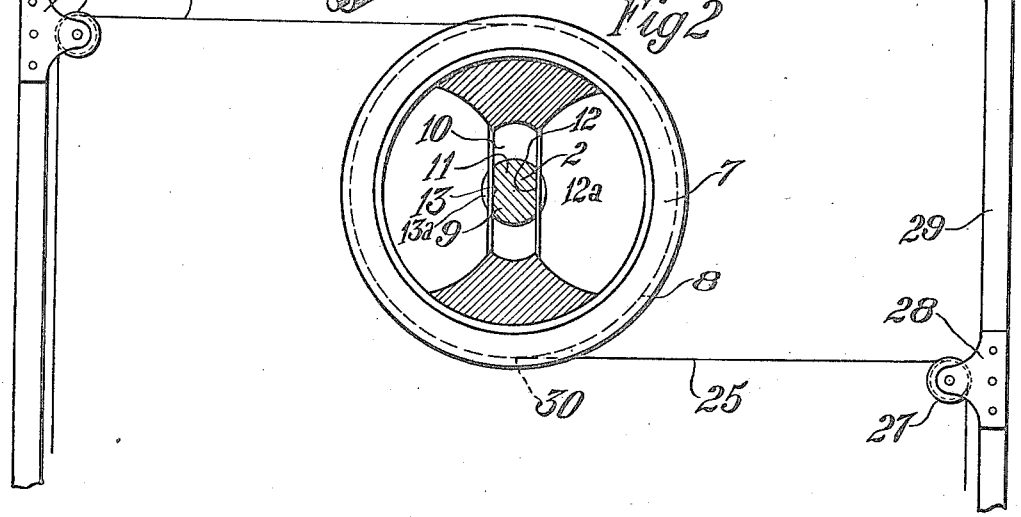
William C. Hurst, Inventor,
By his Attorney,
Henry J. Lucke

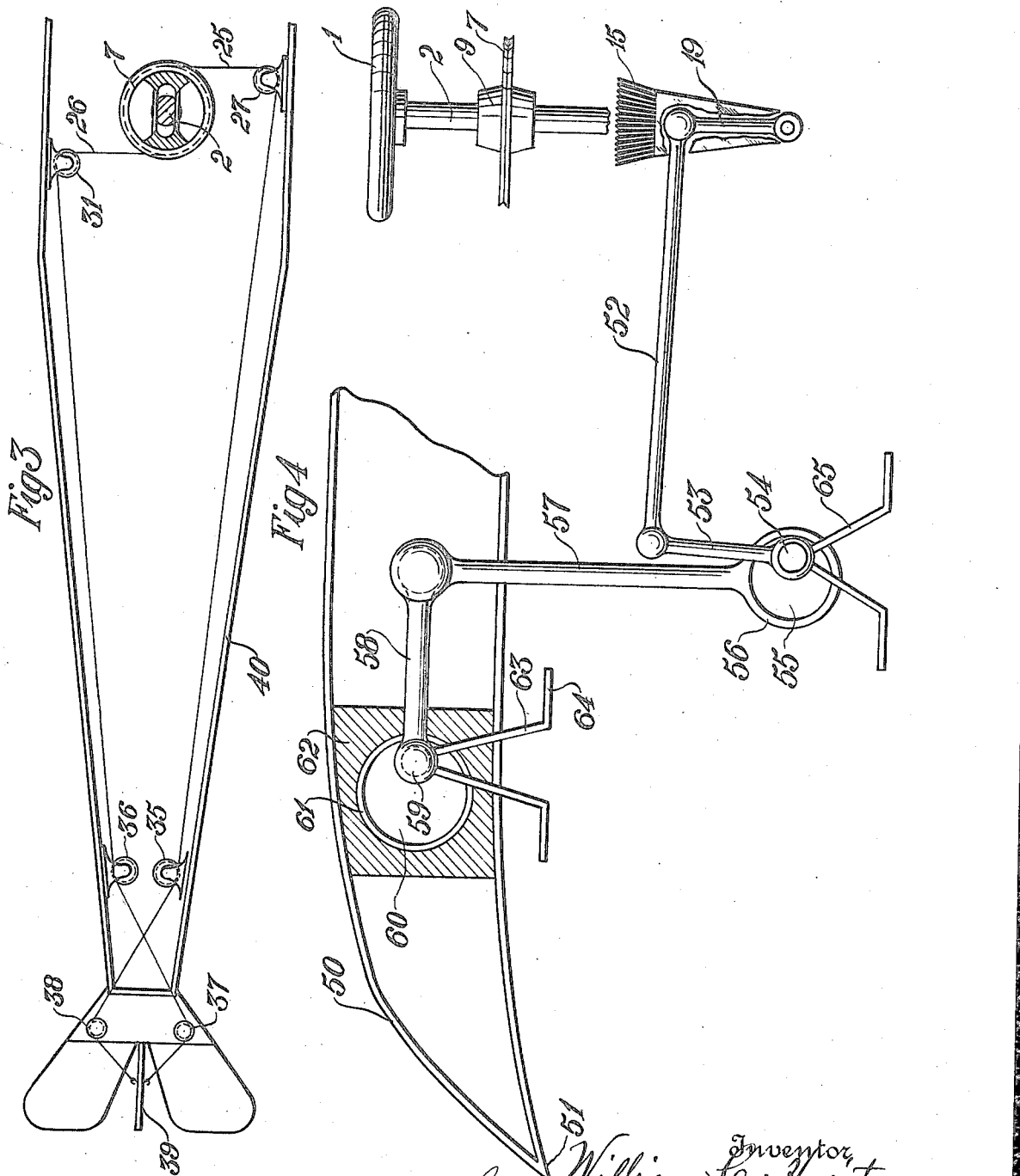

UNITED STATES PATENT OFFICE.

WILLIAM C. HURST, OF NEW YORK, N. Y.

STEERING WHEEL FOR AEROPLANES.

1,424,143.  Specification of Letters Patent.  Patented July 25, 1922.

Application filed May 23, 1921, Serial No. 471,601. Renewed June 9, 1922. Serial No. 567,235.

*To all whom it may concern:*

Be it known that I, WILLIAM C. HURST, a citizen of the United States of America, residing at borough of Manhattan, city, county, and State of New York, have invented certain new and useful Improvements in Steering Wheels for Aeroplanes, of which the following is a specification.

This invention relates to steering devices for airplanes.

An object of this invention is to provide a steering device for airplanes whereby adjustment of the respective planes and of the rudder is effected by a single control device. A further object of the invention is to provide a steering mechanism of more simple form and which is rugged in construction and arranged to provide for adjustment of the planes through simple mechanical movement.

In accordance with my invention, the steering device is applicable for airplanes having substantially fixed steering planes, a portion of which is flexed or otherwise operated to provide for steering the airplane, or which planes are provided with ailerons or the like, or for airplanes in which the steering planes are wholly or for substantial portion bodily adjusted for different angles of incidence, such as described in my United States Letters Patent No. 994,104, issued to me on the 30th day of May, 1911.

In the more preferred forms of the invention, I provide a steering shaft having a steering wheel and carrying a sheave for controlling the wires of the rudder, such shaft being axially rotatably mounted to actuate the sheave and bodily rotatably mounted on a supplemental shaft extending at right angles to such steering shaft, and opposite, segmental gears rotatably mounted on such supplemental shaft and meshing with a gear fixed to the steering shaft and respectively actuated upon axial rotation of the steering shaft, to respectively control the planes on the opposite sides of the airplane.

Further features and objects of the invention will be more fully understood from the following description and the accompanying drawings, in which—

Fig. 1 is a perspective view of a preferred form of steering device embodying my invention;

Fig. 2 is a horizontal sectional view on line 2—2 of Fig. 1 and showing auxiliary parts coacting with the steering device proper for controlling the elevators; and Fig. 3 is a horizontal sectional view similar to Fig. 2, of my steering device and also showing the connections of the sheave wheel with the rudder; and Fig. 4 is a detail, vertical sectional view of a plane of the type disclosed in my aforesaid United States Letters Patent No. 994,104, dated May 30, 1911, entitled Airship, controlled by the steering device illustrated in the aforesaid figures.

Referring to the drawings, the steering device proper comprises the steering hand wheel 1 fixedly mounted on the steering shaft 2, rotatably mounted in the collar 3 for rotation about its own axis. The collar 3 forms a T-coupling through which extends the supplemental shaft 4, projecting for all positions of the steering shaft 2 at right angles to the steering shaft 2. The supplemental shaft 4 is suitably mounted at its opposite ends 5, 6, in bearings or the like for rotation about its own axis. Mounted on the steering shaft 2 is the sheave 7, the peripheral edge 8 of which is grooved to receive the control wires of the rudder, referred to more particularly hereinafter. The hub 9 of the sheave 7 is of general oval outer contour and is provided with the substantially central, rectilinear slot 10 through which passes the oppositely flattened portion 11 of the steering shaft 2, as is shown more fully in Fig. 2, such flattened portion 11 of the steering shaft 2 comprising the diametrically opposite faces 12, 13. Accordingly, such sheave 7 is horizontally mounted on the steering shaft 2 to enable the steering shaft 2 to be bodily rotated about the axis of the supplemental shaft 4 without affecting the position of the sheave 7 in a rotative sense about the axis of the steering shaft 2.

Fixed to the steering shaft 2, at a suitable position below the sheave 7, is the cone-gear 14 meshing respectively with the oppositely disposed segment gears 15, 16. The segment gear 15 is pivotally mounted on the shaft 4 and its hub 17 is integral with or otherwise fixedly secured to one end of the collar 18, the opposite end of which is fixed to the arm 19, provided with the eye 20.

Similarly, the segment gear 16 is pivotally mounted on the opposite extension of the auxiliary shaft 4, by means of its hub 21, integral with or otherwise fixedly secured to one end of the collar 22, the opposite end of which is fixed to the arm 23 provided with the eye 24.

Such arms 19, 23 are connected to control wires or levers or other operating elements for attaining differential adjustment or for varying and holding in position the warping devices, ailerons or the like of the planes on the opposite sides of the airplane.

In Fig. 2 I have shown my steering device in detail in respect to the control wires 25, 26, controlling the rudder, the right hand control wire 25 passing about the guide pulley 27, idly mounted in the bracket 28, secured to the horizontal rod 29 on one side of the fuselage or to the frame of the airplane. Such control wire 25 makes initial contact with the sheave 7 at a posteriorly located point of tangent 30 with the circular periphery of the curve 8.

The left hand control wire 26 passes about the guide roller 31 idly mounted in the bracket 32 fixed to the horizontal supporting rod 33, of the fuselage or to the frame of the airplane and the control wire 26 leads off from the sheave 8 at the anterior tangent point of contact 34.

As appears in Fig. 2, the anterior point of contact 34 and the posterior point of contact 30 are substantially parallel to the central axis of the slot 10 in the sheave 7 whereby upon bodily rotating the steering shaft 2 about the axis of the supplemental shaft 4, the sheave 8 will be maintained in the same position relative to the frame of the airplane, that is to say, relative to the horizontal supporting bars 29, 30 and without causing the sheave to be rotated about the longitudinal axis of the steering shaft 2.

Upon rotation of the steering shaft 2 about its longitudinal axis, say in the direction of the arrow 35, Fig. 1, the cone gear 14 will be rotated in the counterclockwise direction as viewed in Fig. 1, causing the segment gear 15 to be bodily rotated about the longitudinal axis of the auxiliary shaft 4 in counterclockwise direction, as viewed in Fig. 1, and causing the segment gear 16 to be bodily rotated about the longitudinal axis of the supplemental shaft 4 in a direction opposite to that of the segment gear 15, that is to say, in clockwise direction. Accordingly, the arms 19 and 23 will be rotated about the supplemental shaft 4 in opposite directions to cause the control wires leading to the respective planes on their respective sides to be operated in opposite directions.

Referring to Fig. 3, the controlling wires 25, 26 wound about the sheave 7 of the steering device pass from the respective pulleys 27, 31, about the oppositely disposed, aft guide pulleys 35, 36, and thence across one another, then pass about the guide pulleys 37, 38 to opposed connection with the rudder 39.

Accordingly, upon anti-clockwise rotation of the steering shaft 2, as viewed in Fig. 3, the control wire 25 will be unwound and the control wire 26 will be wound on the sheave 7 and thereby causing the rudder 39 to be shifted clockwise and causing the airplane to be turned to the left, as viewed by the aviator. Similarly, upon clockwise rotation of the steering shaft 2, the control wire 26 will be unwound and the control wire 25 will be wound on the sheave 7, causing the rudder 39 to be shifted anti-clockwise, veering the airplane to the right.

The frame 40 for supporting the guide pulleys and the rudder 39 may be of any approved construction.

In Fig. 4 I have indicated on an enlarged scale the plane 50 of the bodily rotatable type such as is disclosed in my United States Letters Patent No. 994,104, granted to me on May 30, 1911, and as is also disclosed in my pending application Serial No. 93,371, filed April 25, 1916, entitled Aeroplanes. In such construction of aeroplane, separate planes are mounted respectively on the right and left of the fuselage or central body portion of the airplane, and means are provided for bodily tilting the right and left planes either in the same or in the opposite directions, to vary the angle of incidence of the respective planes.

In Fig. 4 I have indicated a single plane 50 such as the right-hand plane, the leading edge 51 of which is positioned in advance of the steering wheel 1 of my steering device, constructed and arranged as described in the aforesaid figures. To the operating arm 19 is connected one end of the link 52, the opposite end of which is connected to the lever 53 secured to one end of the control shaft 54. To the opposite end of the control shaft is fixed the eccentric 55, the outer eccentric ring 56 of which is connected to the link 57 pivotally connected to the lever 58 secured to the one end of the control shaft 59. The eccentric 60 is connected to the opposite end of the control shaft 59 and coacts with its outer ring 61, lodged within its supporting block 62 extending lengthwise of the plane 50 and substantially parallel to its leading edge 51.

The control shaft 59 is journaled in the bearing bracket 63 secured to the top 64 of the fuselage or frame of the airplane, or in any other approved manner.

The outer end of the plane 50 is pivotally mounted on a pivot shaft, suitably journaled in any approved bearing bracket, such as similar to the bracket 63.

The control shaft 54 is pivotally mounted in any suitable manner as by means of the bearing bracket 65 secured to the floor of the fuselage or to the frame of the airplane or in any other approved manner.

Applying my control device for use with bodily oscillated planes for attaining variable angle of incidence, as is diagrammatically illustrated in Fig. 4, upon anti-clockwise rotation of the steering wheel 1, in the direction of the arrow 35, as indicated in Fig. 1, the rudder 39 will be operated clockwise and the right-hand control arm 19 rotated forwardly, forcing the link 52 forwardly, rotating the eccentric 55 anti-clockwise to lower the link 57, thereby rotating the arm 58 of the eccentric 60 clockwise, to lift the leading edge 51 of the right hand plane 50. By such anti-clockwise rotation of the steering wheel 1, the control arm 23 of my steering device is rotated rearwardly to operate similarly arranged control elements, to depress the leading edge of the left hand plane, whereby the airplane as a whole will be steered to the left, as viewed by the aviator.

Correspondingly, upon clockwise rotation of the steering wheel, the sheave 7 will be rotated clockwise to shift the rudder 39 anti-clockwise as viewed in Fig. 3, and the control arm 19 of my steering device is rotated rearwardly of the airplane, thereby depressing the leading edge 51 of the right-hand plane 50 while the control arm 23 of my steering device is rotated forwardly of the airplane to cause the leading edge of the left-hand plane to be elevated, thereby steering the airplane to the right, as viewed by the aviator.

Upon bodily rotating the steering wheel 1 together with its steering shaft 2, about the supporting pivot shaft 4, say in the direction of the operator, that is to say, toward the right in Figs. 1 and 4, both the right and left hand planes 50 will be oscillated clockwise, as viewed in Fig. 4, to elevate their leading edges 51, whereby the planes will be operated for attaining rising of the airplane.

Upon bodily rotating the steering wheel 1 together with its steering shaft 2 in the opposite direction, that is to say, away from the operator, toward the left in Fig. 1, both the left-hand and right-hand planes 50 will be operated anti-clockwise, as viewed in Fig. 4, and to lower their leading edges 51 whereby the airplane is steered downwardly.

In both such operations of bodily rotating the steering shaft to raise and lower the leading edges of the planes, the sheave 7 will be maintained in its normal position, and the rudder 39 maintained in straight-ahead position.

It will be noted that the flattened sides 12, 13, of the steering shaft 2 extend but partially longitudinally of the steering shaft 2, to provide the oppositely disposed substantially horizontal flattened faces 12ª, 13ª, for slidingly supporting the sheave 7 on such flattened faces 12ª, 13ª.

The operation of my steering device for aeroplanes, it will be observed, functions similarly to the steering wheel of an automobile for opposite axial rotations of the steering wheel of my aeroplane steering device, that is to say, clockwise rotation of the steering wheel effects the right-hand turn of the aeroplane and counter-clockwise rotation of the steering wheel effects the left-hand turn of the aeroplane.

Whereas I have described my invention by reference to specific forms thereof, it will be understood that many changes and modifications may be made without departing from the spirit of the invention, as defined by the appended claims.

I claim.

1. In an aeroplane having oppositely disposed planes and a rudder, of a steering device therefor, comprising a steering shaft, means for axially rotatably mounting said steering shaft, means for bodily rotatably mounting said steering shaft, gearing operated upon axial rotation of said steering shaft and controlling said planes, a controlling element for operating said rudder, and means for mounting said controlling element on said steering shaft to operate said controlling element upon axial rotation of said steering shaft and for rendering said rudder controlling element ineffectual upon bodily rotation of said steering shaft.

2. In an aeroplane having oppositely disposed planes and a rudder, of a steering device therefor, comprising a steering shaft, means for axially rotatably mounting said steering shaft, means for bodily rotatably mounting said steering shaft, a gear mounted on said steering shaft, pivotally disposed segmental gears meshing with said gear, connections actuated by said segment gears respectively for operating said planes, a controlling element for operating said rudder, and means for mounting said controlling element on said steering shaft to operate said controlling element upon axial rotation of said steering shaft and for rendering said rudder controlling element ineffectual upon bodily rotation of said steering shaft.

3. In an aeroplane having oppositely disposed planes and a rudder, of a steering device therefor, comprising a steering shaft, means for axially rotatably mounting said steering shaft, means for bodily rotatably mounting said steering shaft, a conical gear mounted on said steering shaft, pivotally disposed segmental gears meshing with said gear, connections actuated by said segment gears respectively for operating said planes, a controlling element for operating said rudder, and means for mounting said controlling element on said steering shaft to operate said controlling element upon axial rotation of said steering shaft and for rendering said rudder controlling element ineffectual upon bodily rotation of said steering shaft.

4. In an aeroplane having oppositely disposed planes and a rudder, of a steering device therefor, comprising a steering shaft, means for axially rotatably mounting said steering shaft, means for bodily rotatably mounting said steering shaft, a conical gear mounted on said steering shaft, pivotally disposed segmental gears meshing with said gear, means for pivotally mounting said segmental gears on said second named mounting means of said steering shaft, connections actuated by said segment gears respectively for operating said planes, a controlling element for operating said rudder, and means for mounting said controlling element on said steering shaft to operate said controlling element upon axial rotation of said steering shaft and for rendering said rudder controlling element ineffectual upon bodily rotation of said steering shaft.

5. In an aeroplane, a steering device therefor, comprising a steering shaft, means for axially rotatably mounting said steering shaft, means for bodily rotatably mounting said steering shaft, gearing operated upon axial rotation of said steering shaft and controlling the wings, a controlling element for operating the rudder, and means for mounting said controlling element on said steering shaft to operate said controlling element upon axial rotation of said steering shaft and for rendering said rudder controlling element ineffectual upon bodily rotation of said steering shaft.

In testimony whereof I have signed this specification this 17th day of May, 1921.

WILLIAM C. HURST.